United States Patent
Ji et al.

(10) Patent No.: US 7,783,816 B2
(45) Date of Patent: Aug. 24, 2010

(54) COMPUTER CAPABLE OF AUTOMATIC BANDWIDTH CONFIGURATION ACCORDING TO I/O EXPANSION CARD TYPE

(75) Inventors: Hai-Yi Ji, Shanghai (CN); Shih-Hao Liu, Taipei (TW)

(73) Assignee: Inventec Coporation, Taipei (TW)

( * ) Notice: Subject to any disclaimer, the term of this patent is extended or adjusted under 35 U.S.C. 154(b) by 34 days.

(21) Appl. No.: 12/328,486

(22) Filed: Dec. 4, 2008

(65) Prior Publication Data

US 2010/0100657 A1    Apr. 22, 2010

(30) Foreign Application Priority Data

Oct. 16, 2008    (CN) .................... 2008 1 0169744

(51) Int. Cl.
    *G06F 13/40* (2006.01)
(52) U.S. Cl. ......................... 710/307; 710/314; 710/8
(58) Field of Classification Search .......... 710/307, 710/301–302, 313–314, 316, 8
    See application file for complete search history.

(56) References Cited

U.S. PATENT DOCUMENTS

| 7,536,490 | B2 * | 5/2009 | Mao ......................... 710/104 |
| 2007/0214301 | A1 * | 9/2007 | Chen ....................... 710/301 |
| 2008/0313381 | A1 * | 12/2008 | Leigh et al. ............... 710/313 |
| 2009/0006708 | A1 * | 1/2009 | Lim ......................... 710/314 |

FOREIGN PATENT DOCUMENTS

TW    200723007    6/2007

* cited by examiner

*Primary Examiner*—Clifford H Knoll
(74) *Attorney, Agent, or Firm*—J.C. Patents

(57) ABSTRACT

A computer capable of automatic bandwidth configuration according to I/O expansion card (e.g., PCI-Express expansion card) type is provided. A motherboard of the computer includes an I/O expansion slot, a chipset, and a configuration setting circuit. When the I/O expansion slot supports different types of I/O expansion cards having multiple interface card slot combinations, a corresponding bandwidth configuration message is generated on the I/O expansion card. The bandwidth configuration message is used to indicate the type of the I/O expansion card that is being used and thereby control the configuration setting circuit to adjust the bandwidth configuration in the chipset.

7 Claims, 7 Drawing Sheets

COMPUTER CAPABLE OF AUTOMATIC BANDWIDTH CONFIGURATION ACCORDING TO I/O EXPANSION CARD TYPE

CROSS-REFERENCE TO RELATED APPLICATION

This application claims the priority benefit of China application serial no. 200810169744.0, filed on Oct. 16, 2008. The entirety of the above-mentioned patent application is hereby incorporated by reference herein and made a part of specification.

BACKGROUND OF THE INVENTION

1. Field of the Invention

The present invention generally relates to a computer, and more particularly, to a computer capable of automatic bandwidth configuration according to a type of an I/O expansion card.

2. Description of Related Art

In the interior of a known computer platform, the central processing unit (CPU) and various hardware components are typically interconnected by a bus to transmit data therebetween. Following continuous advancing of hardware design, various high speed bus design concepts have been continuously developed to meet the need of high speed transmission of huge quantity of data.

Various interface cards have been used to expand functions of the computer platform. By plugging the interface cards into I/O expansion slots of the computer, the interface cards can provide the computer user with desired services. However, the number of the I/O expansion slots of the computer platform is often limited by the space and cost. An I/O expansion card is used to provide a plurality of interface card slots for accepting multiple interface cards and thus serves the purpose of increasing the I/O expansion slots number. When multiple interface cards are plugged into the interface card slots of the I/O expansion card and therefore coupled to the I/O expansion slot through the I/O expansion card, the bandwidth of the I/O expansion slot is shared by the multiple interface cards.

FIG. 1 illustrates a PCI-Express interface bus architecture for a computer in which a chipset $CS_1$ provides multiple I/O expansion slots $Slot_0$~$Slot_2$. In the existing design, the bandwidth configurations of the I/O expansion slots $Slot_0$~$Slot_2$ are determined based on input signals of configuration setting pins of the chipset $CS_1$. Therefore, the bandwidth configurations of the I/O expansion slots $Slot_0$~$Slot_2$ are fixed, and the bandwidth configurations of the multiple interface card slots of the I/O expansion cards are also fixed. However, it is impossible to know the bandwidth configurations of the I/O expansion cards in advance.

SUMMARY OF THE INVENTION

Accordingly, the present invention is directed to a computer including an I/O expansion card and a motherboard, which can automatically adjust bandwidth configuration based on bandwidth requirements of the I/O expansion card.

The present invention provides a computer including an I/O expansion card and a motherboard. The I/O expansion card includes an interface card slot and a configuration message generator. The interface card slot is used to selectively accept an interface card. The configuration message generator is used to provide a bandwidth configuration message corresponding to the interface card slot. The motherboard includes an I/O expansion slot, a chipset, and a configuration setting circuit. The I/O expansion slot is used to accept the I/O expansion card. The chipset is coupled to the I/O expansion slot so as to be connected to the interface card slot of the I/O expansion card through the I/O expansion slot. The configuration setting circuit is coupled to the chipset and the I/O expansion slot. The configuration setting circuit is used to obtain the bandwidth configuration message through the I/O expansion slot and set an internal interface-card-bandwidth configuration in the chipset based on the bandwidth configuration message.

According to one embodiment of the present invention, the interface card slot is a PCI-Express slot, and the internal interface-card-bandwidth configuration set by the configuration setting circuit is a PCI-Express bandwidth configuration in the chipset.

According to one embodiment of the present invention, the configuration setting circuit is coupled to configuration setting pins of the chipset. The configuration setting circuit includes a default digital code generating circuit and an adjustment circuit. The default digital code generating circuit is used to generate a default digital code. The adjustment circuit is coupled to the default digital code generating circuit, the configuration setting pins of the chipset and the I/O expansion slot. The adjustment circuit is used to adjust the default digital code provided by the default digital code generating circuit according to the bandwidth configuration message and output the adjusted default digital code to the configuration setting pins of the chipset to set the internal interface-card-bandwidth configuration in the chipset.

According to one embodiment of the present invention, the configuration setting circuit is coupled to configuration setting pins of the chipset. The configuration setting circuit includes a complex programmable logic device (CPLD) coupled to the configuration setting pins of the chipset and the I/O expansion slot. The CPLD is used to generate a corresponding digital code according to the bandwidth configuration message and output the digital code to the configuration setting pins of the chipset to set the internal interface-card-bandwidth configuration in the chipset.

According to one embodiment of the present invention, the configuration setting circuit is coupled to configuration setting pins of the chipset. The configuration setting circuit includes an encoding circuit coupled to the configuration setting pins of the chipset and the I/O expansion slot. The encoding circuit is used to generate a corresponding digital code by encoding the bandwidth configuration message and output the digital code to the configuration setting pins of the chipset to set the internal interface-card-bandwidth configuration in the chipset.

According to one embodiment of the present invention, the configuration setting circuit is coupled to configuration setting pins of the chipset. The configuration setting circuit includes a micro processor coupled to the configuration setting pins of the chipset and the I/O expansion slot. The micro processor is used to look up a digital code corresponding to the bandwidth configuration message and output the digital code to the configuration setting pins of the chipset to set the internal interface-card-bandwidth configuration in the chipset.

The present invention provides a computer including an I/O expansion card and a motherboard. When the I/O expansion slot supports different types of I/O expansion cards having multiple interface card slot combinations, a configuration message generator disposed on the I/O expansion card generates a bandwidth configuration message outputted to the I/O expansion slot according to the type of the interface card that is being used. A configuration setting circuit is coupled to the I/O expansion slot and configuration setting pins of the chipset. The configuration setting circuit receives the bandwidth configuration message, generates a bandwidth configuration signal based on the bandwidth configuration message, and outputs the bandwidth configuration signal to the configuration setting pins of the chipset. The internal interface-card-bandwidth configuration in the chipset can be set based on the bandwidth configuration signal, thereby automatically adjusting the chipset bandwidth configuration to meet the bandwidth requirement of the interface cards plugged into the I/O expansion card.

In order to make the aforementioned and other features and advantages of the present invention more comprehensible, embodiments accompanied with figures are described in detail below.

DESCRIPTION OF THE EMBODIMENTS

Features and advantages of the automatic bandwidth configuration of the I/O expansion card will now be described in junction with preferred embodiments below that are illustrated in the accompanying drawings.

Figure 1:
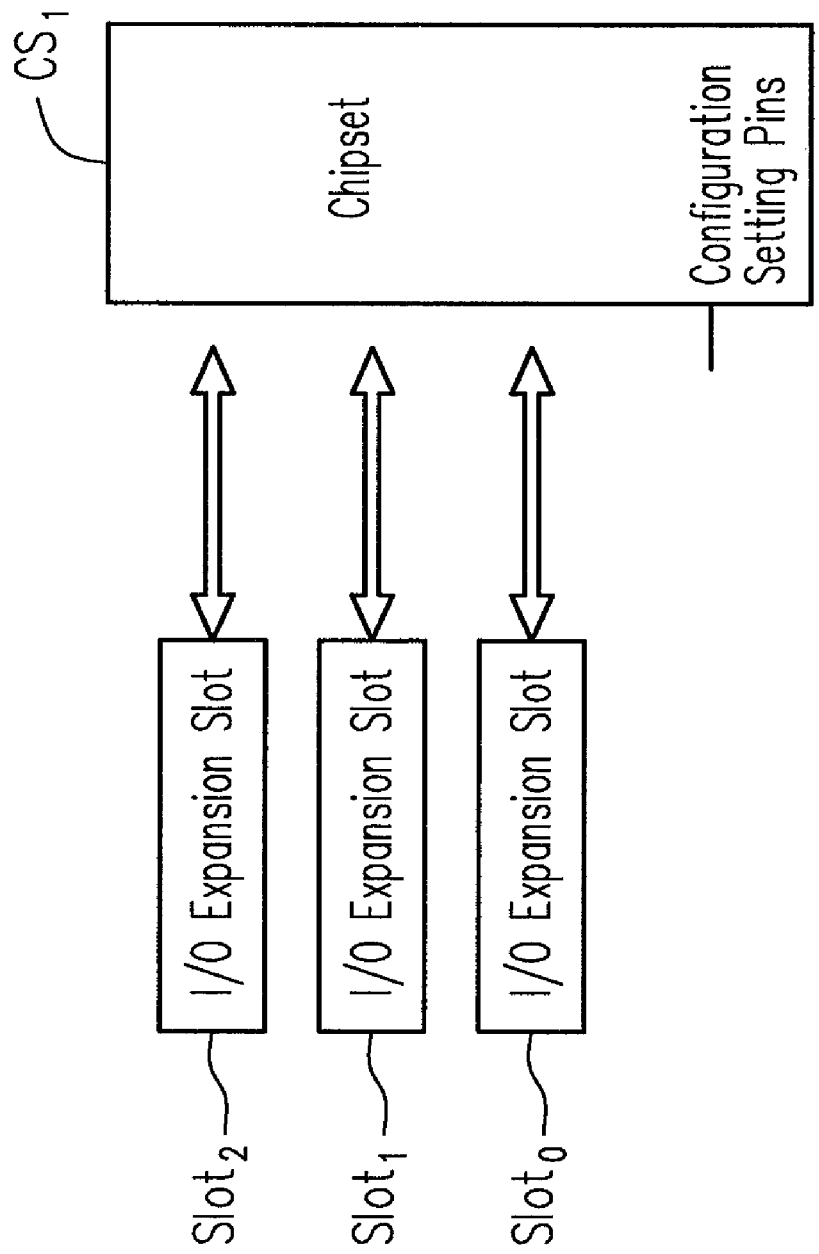
FIG. 1 illustrates a PCI-Express interface bus architecture of a known computer platform.
Figure 2:
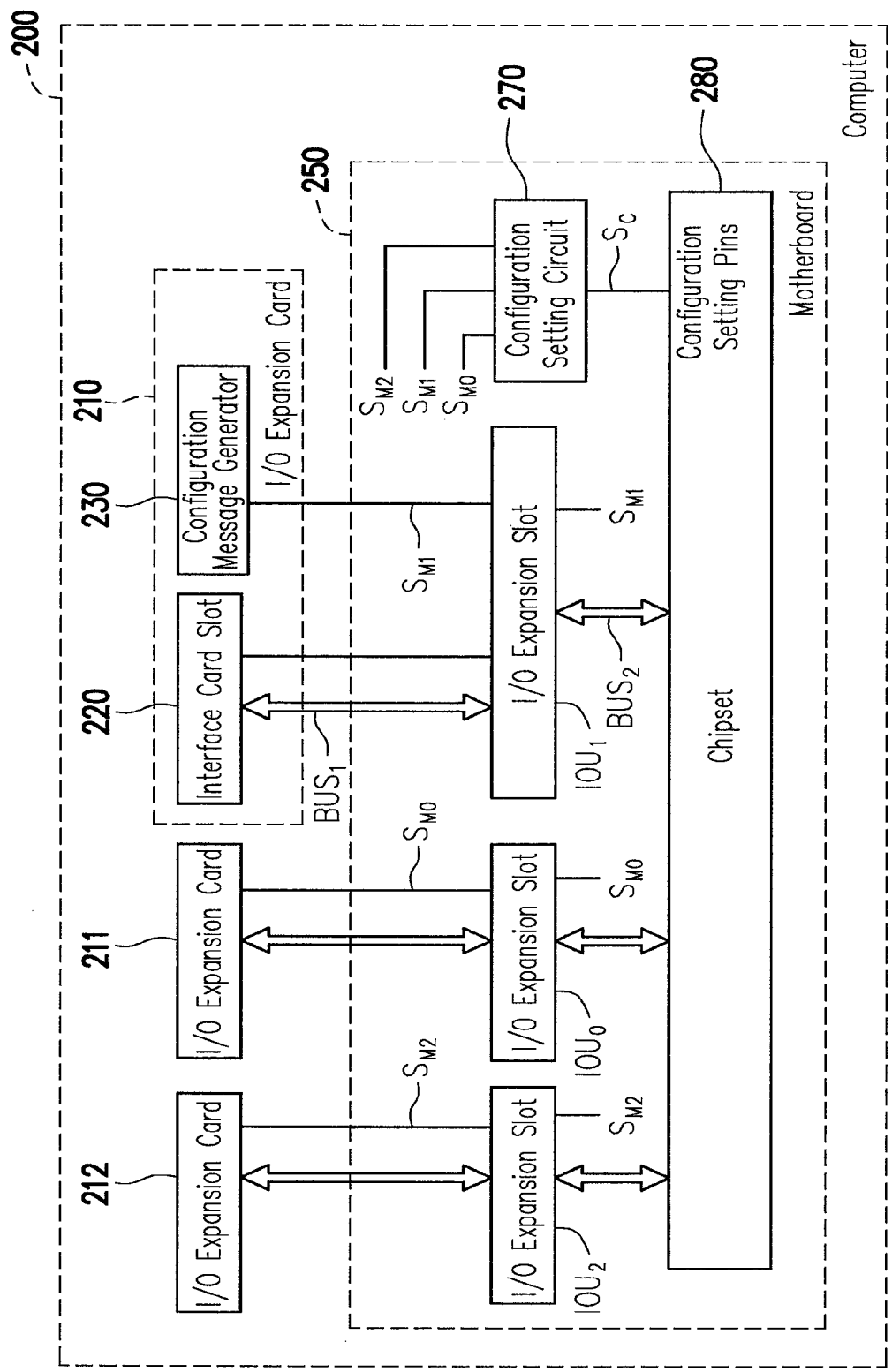
FIG. 2 illustrates a diagram depicting an exemplary bandwidth configuration of computer I/O expansion cards according to an embodiment of the present invention.

FIG. 2 is a diagram depicting an exemplary bandwidth configuration of computer I/O expansion cards. Referring to FIG. 2, the computer 200 includes an I/O expansion card 210 and a motherboard 250. The I/O expansion card 210 has an interface card slot 220 and a configuration message generator 230. While only one exemplary interface card slot 220 is illustrated in FIG. 2, it is to be understood that the I/O expansion card 210 could have one or more interface card slots. The interface card slot 220 is coupled to an I/O expansion slot $IOU_1$ by a bus $BUS_1$ and is adapted to accept an interface card thereinto. The configuration message generator 230 is coupled to the I/O expansion slot $IOU_1$ and used to generate a bandwidth configuration message $S_{M1}$ corresponding to the interface card slot 220 for indicating the bandwidth configuration of the interface card slot 220.

The motherboard 250 includes three I/O expansion slots $IOU_0$~$IOU_2$, a chipset 280, and a configuration setting circuit 270. The I/O expansion slot $IOU_1$ is used to accept the I/O expansion card 210, the I/O expansion slot $IOU_0$ is used to accept an I/O expansion card 211, and the I/O expansion slot $IOU_2$ is used to accept an I/O expansion card 212. As described above, the motherboard 250 can have one or more I/O expansion slots and detail description is only made herein regarding the exemplary I/O expansion slot $IOU_1$. The chipset 280 and the I/O expansion slot $IOU_1$ are coupled by a bus $BUS_2$. The bus $BUS_1$ is coupled to the bus $BUS_2$ through the I/O expansion slot $IOU_1$. The configuration setting circuit 270 is coupled between the chipset 280 and the I/O expansion slot $IOU_1$. The bandwidth configuration message $S_{M1}$ generated by the configuration message generator 230 is transmitted to the configuration setting circuit 270 through the I/O expansion slot $IOU_1$. The configuration setting circuit 270 generates a bandwidth configuration signal $S_C$ transmitted to the chipset 280 in response to the bandwidth configuration message $S_{M1}$. The bandwidth configuration signal $S_C$ is used to set the internal interface-card-bandwidth configuration in the chipset 280.

In the present embodiment, the chipset 280 is a north bridge chip. While the chipset 280 is illustrated as the north bridge chip in the exemplary embodiment, it is to be understood that the chipset 280 could be other chipsets of the similar bus interface. In the present embodiment, the interface card slot 220 is a PCI-Express interface slot and therefore the internal interface-card-bandwidth configuration in the chipset 280 set by the configuration setting circuit 270 is the PCI-Express bandwidth configuration in the chipset 280.

In the present embodiment, configuration setting pins of the chipset 280 have six bits, i.e., PEWIDTH[5..0]. The chipset 280 has thirty-six differential lines which are allocated into three I/O expansion slots $IOU_0$~$IOU_2$. The bandwidth configuration combinations of the ports of the chipset 280 (i.e., the bandwidth configuration combinations of the I/O expansion slots $IOU_0$~$IOU_2$) can be flexibly changed. In the present embodiment, the I/O expansion slot $IOU_2$ has two PCIEX2 ports, the I/O expansion slot $IOU_0$ has four PCIEX4 ports, and the I/O expansion slot $IOU_1$ has four PCIEX4 ports, as shown in Table 1. As shown, when different bandwidth configuration signals $S_C$ are transmitted to the configuration setting pins PEWIDTH[5..0], the I/O expansion slots $IOU_0$~$IOU_2$ can be set to have corresponding bandwidth configurations.

TABLE 1

Bandwidth Configuration Setting Table

| | $IOU_2$ | | $IOU_0$ | | | | $IOU_1$ | | | |
| --- | --- | --- | --- | --- | --- | --- | --- | --- | --- | --- |
| PEWIDTH[5 ... 0] | Port1 | Port2 | Port3 | Port4 | Port5 | Port6 | Port7 | Port8 | Port9 | Port10 |
| | x2 | x2 | x4 | x4 | x4 | x4 | x4 | x4 | x4 | x4 |
| 000000 | x2 | x2 | x4 | x4 | x4 | x4 | x4 | x4 | x4 | x4 |
| 000001 | x2 | x2 | x4 | x4 | x4 | x4 | x8 | | x4 | x4 |
| 000010 | x2 | x2 | x4 | x4 | x4 | x4 | x4 | x4 | x8 | |
| 000011 | x2 | x2 | x4 | x4 | x4 | x4 | x8 | | x8 | |
| 000100 | x2 | x2 | x8 | | x4 | x4 | x4 | x4 | x4 | x4 |
| 000101 | x2 | x2 | x8 | | x4 | x4 | x8 | | x4 | x4 |

TABLE 1-continued

Bandwidth Configuration Setting Table

| | IOU₂ | | IOU₀ | | | | IOU₁ | | | |
|---|---|---|---|---|---|---|---|---|---|---|
| PEWIDTH[5...0] | Port1 | Port2 | Port3 | Port4 | Port5 | Port6 | Port7 | Port8 | Port9 | Port10 |
| 000110 | x2 | x2 | | x8 | | x4 | x4 | x4 | x4 | x8 |
| 000111 | x2 | x2 | | x8 | | x4 | x4 | x8 | | x8 |
| 001000 | x2 | x2 | x4 | x4 | | x8 | x4 | x4 | x4 | x4 |
| 001001 | x2 | x2 | x4 | x4 | | x8 | | x8 | x4 | x4 |
| 001010 | x2 | x2 | x4 | x4 | | x8 | x4 | x4 | | x8 |
| 001011 | x2 | x2 | x4 | x4 | | x8 | | x8 | | x8 |
| 001100 | x2 | x2 | | x8 | | x8 | x4 | x4 | x4 | x4 |
| 001101 | x2 | x2 | | x8 | | x8 | | x8 | x4 | x4 |
| 001110 | x2 | x2 | | x8 | | x8 | x4 | x4 | | x8 |
| 001111 | x2 | x2 | | x8 | | x8 | | x8 | | x8 |
| 010000 | x2 | x2 | | X16 | | | x4 | x4 | x4 | x4 |
| 010001 | x2 | x2 | | X16 | | | | x8 | x4 | x4 |
| 010010 | x2 | x2 | | X16 | | | x4 | x4 | | x8 |
| 010011 | x2 | x2 | | X16 | | | | x8 | | x8 |
| 010100 | X2 | x2 | x4 | x4 | x4 | x4 | | | x16 | |
| 010101 | X2 | x2 | | x8 | x4 | x4 | | | x16 | |
| 010110 | X2 | x2 | x4 | x4 | | x8 | | | x16 | |
| 010111 | X2 | x2 | | x8 | | x8 | | | x16 | |
| 011000 | X2 | x2 | | X16 | | | | | x16 | |
| 011001 | X2 | x2 | | X16 | | | | | x16 | |
| 011010 | X2 | x2 | | X16 | | | | | x16 | |
| 011011 | X2 | x2 | | X16 | | | | | x16 | |
| 011100 | | | | | | | Wait-on-BIOS | | | |
| 011101 | | | | | | | Wait-on-BIOS | | | |
| 011110 | | | | | | | Wait-on-BIOS | | | |
| 011111 | | | | | | | Wait-on-BIOS | | | |
| 100000 | | x4 | x4 | x4 | x4 | x4 | x4 | x4 | x4 | x4 |
| 100001 | | x4 | x4 | x4 | x4 | x4 | | x8 | x4 | x4 |
| 100010 | | x4 | x4 | x4 | x4 | x4 | x4 | x4 | | x8 |
| 100011 | | x4 | x4 | x4 | x4 | x4 | | x8 | | x8 |
| 100100 | | x4 | | x8 | x4 | x4 | x4 | x4 | x4 | x4 |
| 100101 | | x4 | | x8 | x4 | x4 | | x8 | x4 | x4 |
| 100110 | | x4 | | x8 | x4 | x4 | x4 | x4 | | x8 |
| 100111 | | x4 | | x8 | x4 | x4 | | x8 | | x8 |
| 101000 | | x4 | x4 | x4 | | x8 | x4 | x4 | x4 | x4 |
| 101001 | | x4 | x4 | x4 | | x8 | | x8 | x4 | x4 |
| 101010 | | x4 | x4 | x4 | | x8 | x4 | x4 | | x8 |
| 101011 | | x4 | x4 | x4 | | x8 | | x8 | | x8 |
| 101100 | | x4 | | x8 | | x8 | x4 | x4 | x4 | x4 |
| 101101 | | x4 | | x8 | | x8 | | x8 | x4 | x4 |
| 101110 | | x4 | | x8 | | x8 | x4 | x4 | | x8 |
| 101111 | | x4 | | x8 | | x8 | | x8 | | x8 |
| 110000 | | x4 | | X16 | | | x4 | x4 | x4 | x4 |
| 110001 | | x4 | | X16 | | | | x8 | x4 | x4 |
| 110010 | | x4 | | X16 | | | x4 | x4 | | x8 |
| 110011 | | x4 | | X16 | | | | x8 | | x8 |
| 110100 | | x4 | x4 | x4 | x4 | x4 | | | x16 | |
| 110101 | | x4 | | x8 | x4 | x4 | | | x16 | |
| 110110 | | x4 | x4 | x4 | | x8 | | | x16 | |
| 110111 | | x4 | | x8 | | x8 | | | x16 | |
| 111000 | | x4 | | X16 | | | | | x16 | |
| 111001 | | x4 | | X16 | | | | | x16 | |
| 111010 | | x4 | | X16 | | | | | x16 | |
| 111011 | | x4 | | X16 | | | | | x16 | |

Figure 3A:
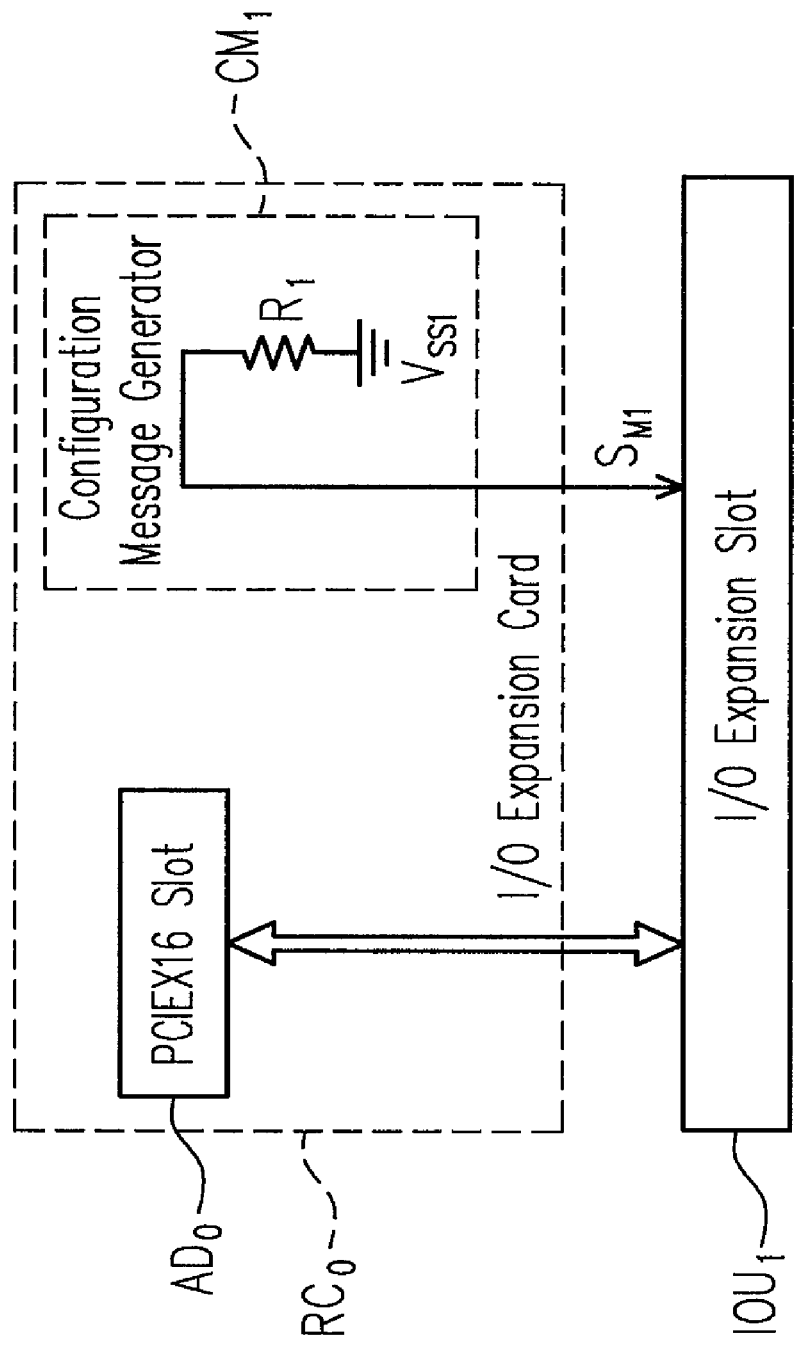
FIGS. 3A-3B illustrate a structure of the I/O expansion card according to a embodiment of the present invention.
Figure 3B:
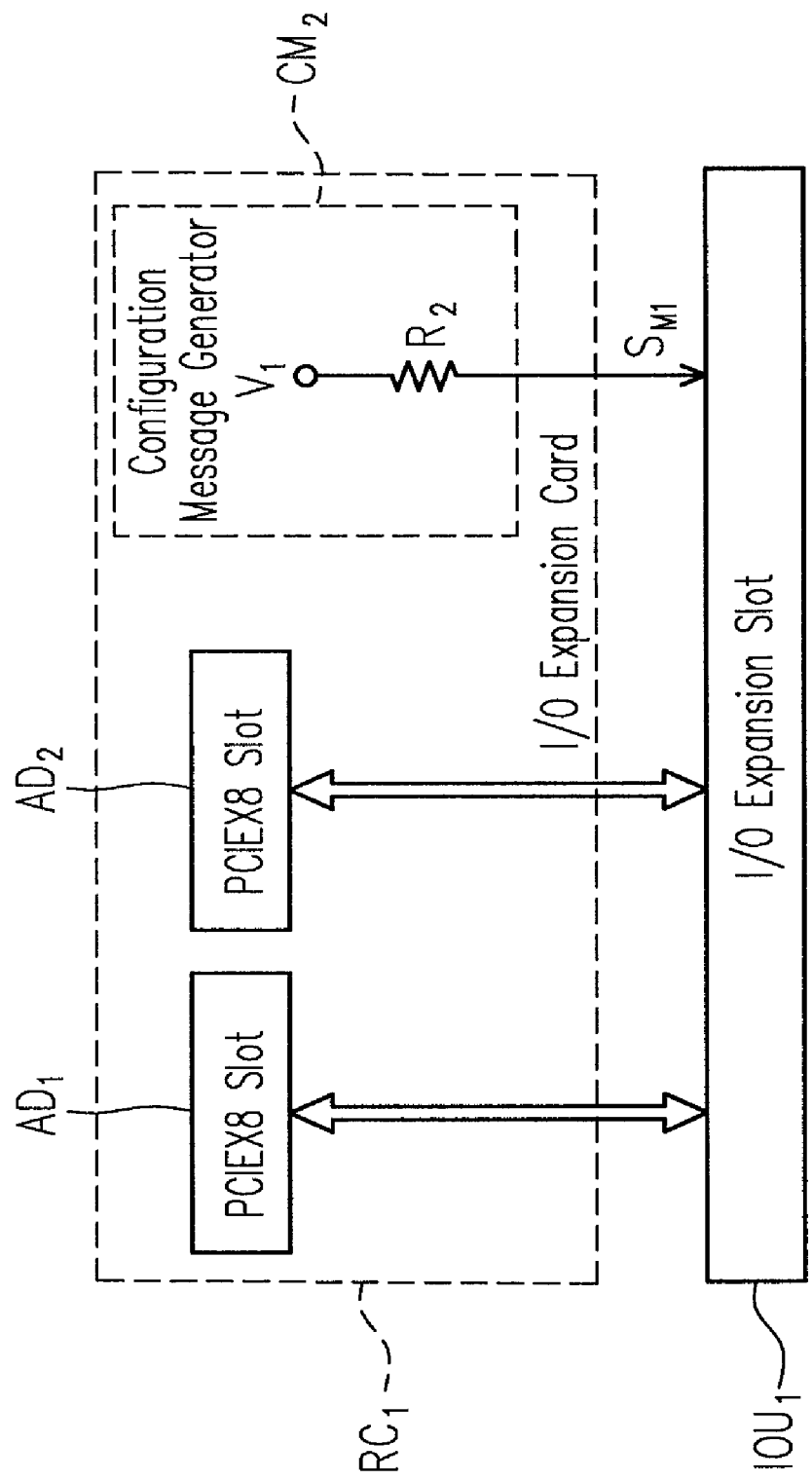

The present embodiment is discussed taking the I/O expansion slot $IOU_1$ as an example and it should be understood that the I/O expansion slot $IOU_0$ or $IOU_2$ can be configured in a similar way as described. It is assumed that the I/O expansion slot $IOU_1$ supports two types of I/O expansion cards, i.e., the I/O expansion card $RC_0$ shown in FIG. 3A and the I/O expansion card $RC_1$ shown in FIG. 3B. Referring to FIG. 3A, the I/O expansion card $RC_0$ includes a PCIEX16 interface card slot $AD_0$ and a configuration message generator $CM_1$ having a pull-down resistor $R_1$. One end of the pull-down resistor $R_1$ is coupled to a reference voltage $V_{SS1}$ to generate a bandwidth configuration message $S_{M1}$ (low voltage level) for the interface card slot $AD_0$. Referring to FIG. 3B, the I/O expansion card $RC_1$ includes two PCIEX8 interface card slots $AD_1 \sim AD_2$ and a configuration message generator $CM_2$ having a pull-up resistor $R_2$. One end of the pull-up resistor $R_2$ is coupled to a voltage source $V_1$ to generate a bandwidth configuration message $S_{M1}$ (high voltage level) for the interface card slots $AD_1 \sim AD_2$.

Figure 4:
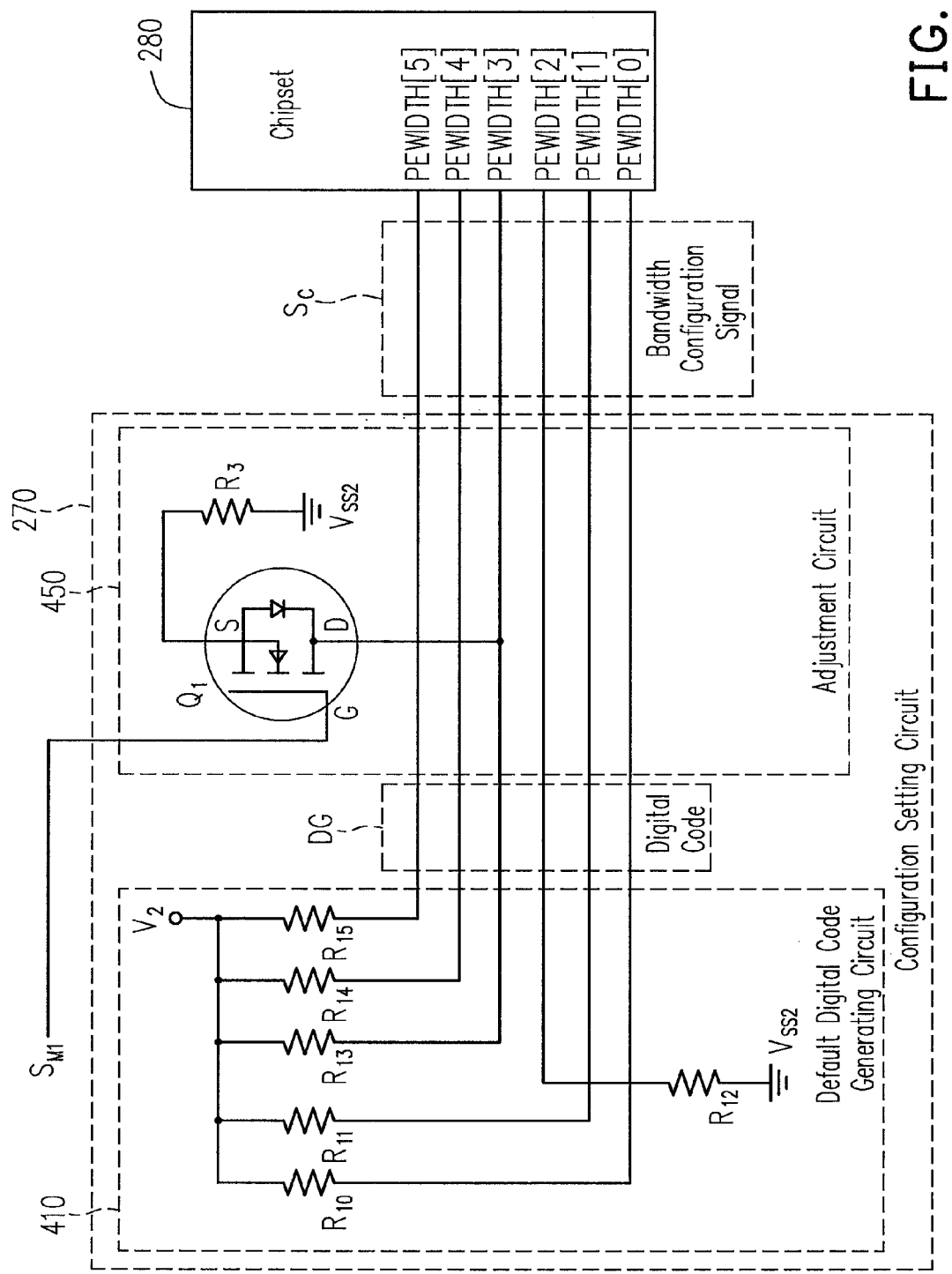
FIG. 4 illustrates a diagram of the configuration setting circuit of the embodiment of the present invention.

FIG. 4 illustrates a circuit diagram of the configuration setting circuit 270. The configuration setting circuit 270 includes a default digital code generating circuit 410 and an adjustment circuit 450. It is noted that FIG. 4 does not show the entire circuit of the default digital code generating circuit 410, but only shows a voltage source $V_2$ and resistors $R_{10} \sim R_{15}$ in which the resistor $R_{12}$ is a pull-down resistor and the resistors $R_{10} \sim R_{11}$ and $R_{13} \sim R_{15}$ are pull-up resistors. The default digital code generating circuit 410 can output a default code "111011" to the adjustment circuit 450 under the operation of the pull-down resistor $R_{12}$ and the pull-up resistors $R_{10} \sim R_{11}$ and $R_{13} \sim R_{15}$. When the I/O expansion card $RC_0$ (or $RC_1$) is plugged into the I/O expansion slot $IOU_1$, the adjustment circuit 450 can adjust the default code "111011" supplied from the default digital code generating circuit 410 according to the bandwidth configuration message $S_{M1}$ generated by the configuration message generator $CM_1$ (or $CM_2$), and output the adjusted default code to the configuration setting pins PEWIDTH[5..0] of the chipset 280 to set an internal PCI-Express bandwidth configuration in the chipset 280. According to settings of Table 1, when the I/O expansion card $RC_0$ is plugged into the I/O expansion slot $IOU_1$, the adjustment circuit 450 does not adjust the default code "111011" according to the bandwidth configuration message $S_{M1}$ generated by the configuration message generator $CM_1$, but directly transmits the default code "111011" to the configuration setting pins PEWIDTH[5..0]. When the I/O expansion card $RC_1$ is plugged into the I/O expansion slot $IOU_1$, the adjustment circuit 450 adjusts the default code "111011" supplied from the default digital code generating circuit 410 to code "110011" according to the bandwidth configuration message $S_{M1}$ generated by the configuration message generator $CM_2$, and outputs the adjusted default code "110011" to the configuration setting pins PEWIDTH[5..0] of the chipset 280. As such, an adaptive bandwidth allocation can be achieved for the I/O expansion card $RC_0$ or $RC_1$.

FIG. 4 does not show the entire circuit of the adjustment circuit 450, but only shows a metal-oxide-semiconductor field-effect transistor (MOSFET) $Q_1$, a reference voltage $V_{SS2}$ and a resistor $R_3$. While the MOSFET $Q_1$ is used in the present exemplary embodiment, it should be understood that other transistors, electronic components and circuits having the same function can also be employed in alternative embodiments. The gate of the MOSFET $Q_1$ is coupled to the I/O expansion slot $IOU_1$. The configuration message generator 230 (corresponding to the configuration message generator $CM_1$ in FIG. 3A or configuration message generator $CM_2$ in FIG. 3B) generates a bandwidth configuration message $S_{M1}$ which is transmitted to the gate of the MOSFET $Q_1$ through the I/O expansion slot $IOU_1$. The source of the MOSFET $Q_1$ is coupled to the reference voltage $V_{SS2}$ (low voltage level) through the pull-down resistor $R_3$. The drain of the MOSFET $Q_1$ is coupled to the voltage source $V_2$ (high voltage level) through the pull-up resistor $R_{13}$.

When the I/O expansion card $RC_0$ is plugged into the I/O expansion slot $IOU_1$, the configuration message generator $CM_1$ of the I/O expansion card $RC_0$ generates a low voltage level bandwidth configuration message $S_{M1}$ such that the MOSFET $Q_1$ is turned off and the drain voltage of the MOSFET $Q_1$ is in a high level. The adjustment circuit 450 outputs the adjusted digital code DG (the default code "111011" at this time) as a bandwidth configuration signal $S_C$. The configuration setting pins PEWIDTH[5..0] of the chipset 280 set the PCI-Express bandwidth configuration in the chipset 280 according to the bandwidth configuration signal $S_C$. As such, the chipset 280 determines that the I/O expansion card $RC_0$ has one PCIEX16 interface card slot $AD_0$.

When the I/O expansion card $RC_1$ is plugged into the I/O expansion slot $IOU_1$, the configuration message generator $CM_2$ of the I/O expansion card $RC_1$ generates a high voltage level bandwidth configuration message $S_{M1}$ such that the MOSFET $Q_1$ is turned on and the drain voltage of the MOSFET $Q_1$ is in a low level. The adjustment circuit 450 outputs the adjusted digital code DG (digital code "110011" at this time) as a bandwidth configuration signal $S_C$. The configuration setting pins PEWIDTH[5..0] of the chipset 280 set the PCI-Express bandwidth configuration in the chipset 280 according to the bandwidth configuration signal $S_C$. As such, the chipset 280 determines that the I/O expansion card $RC_1$ has two PCIEX8 interface card slots $AD_1$, $AD_2$.

While only one bit of the bandwidth configuration message $S_{M1}$ is adjusted in the present embodiment, it should be understood that multiple MOSFETs or other components, circuits having the same function can be employed to adjust multiple bits of the bandwidth configuration message $S_{M1}$ in alternative embodiments, which is not repeated herein.

Figure 5A:
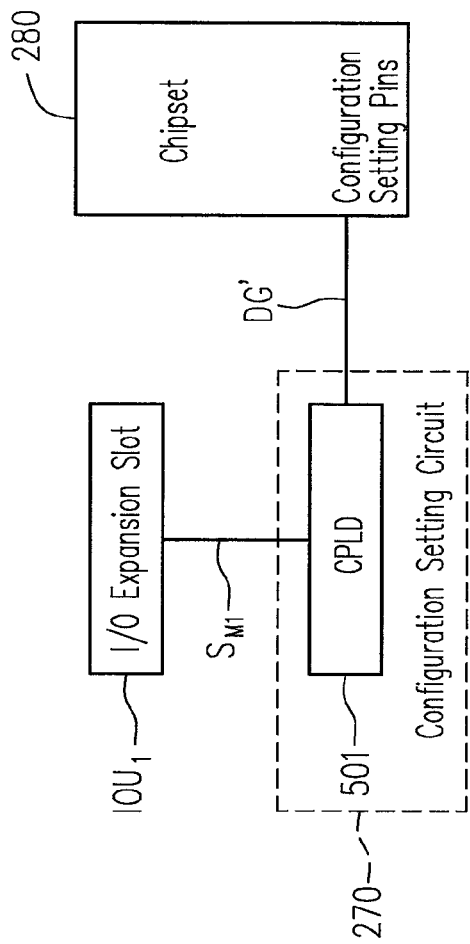
FIG. 5A illustrates a diagram of the configuration setting circuit of a second embodiment of the present invention.

In the embodiment described above, the configuration setting circuit 270 is used to transmit the bandwidth configuration message $S_{M1}$ to the configuration setting pins PEWIDTH [5..0] of the chipset 280. A second embodiment will be described below with reference to FIG. 5A in which the configuration setting circuit 270 includes a complex programmable logic device (CPLD) 501. The CPLD 501 is coupled to the configuration setting pins PEWIDTH[5..0] of the chipset 280 and the I/O expansion slot $IOU_1$. By being programmed in advance, the CPLD 501 can generate a corresponding digital code DG' according to the bandwidth configuration message $S_{M1}$ and the digital code DG' is transmitted to the configuration setting pins PEWIDTH[5..0] of the chipset 280 to set the internal PCI-Express bandwidth configuration in the chipset 280. For example, when the configuration message generator 230 outputs a bandwidth configuration message $S_{M1}$ of "01", the CPLD 501 correspondingly outputs a digital code DG' of "110011" to the configuration setting pins PEWIDTH[5..0]. When the configuration message generator 230 outputs a bandwidth configuration message $S_{M1}$ of "02", the CPLD 501 correspondingly outputs a digital code DG' of "111011" to the configuration setting pins PEWIDTH[5..0].

Figure 5B:
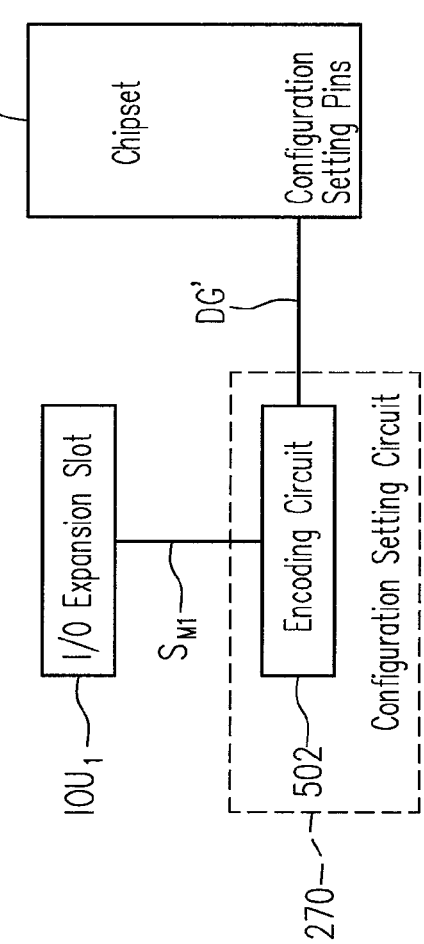
FIG. 5B illustrates a diagram of the configuration setting circuit of a third embodiment of the present invention.

A third embodiment will be described below with reference to FIG. 5B in which the configuration setting circuit 270 includes an encoding circuit 502. The encoding circuit 502 is coupled to the configuration setting pins PEWIDTH[5..0] of the chipset 280 and the I/O expansion slot $IOU_1$. The encoding circuit 502 encodes the bandwidth configuration message $S_{M1}$ to generate a corresponding digital code DG'. The digital code DG' is transmitted to the configuration setting pins PEWIDTH[5..0] of the chipset 280 to set the internal PCI-Express bandwidth configuration in the chipset 280.

Figure 5C:
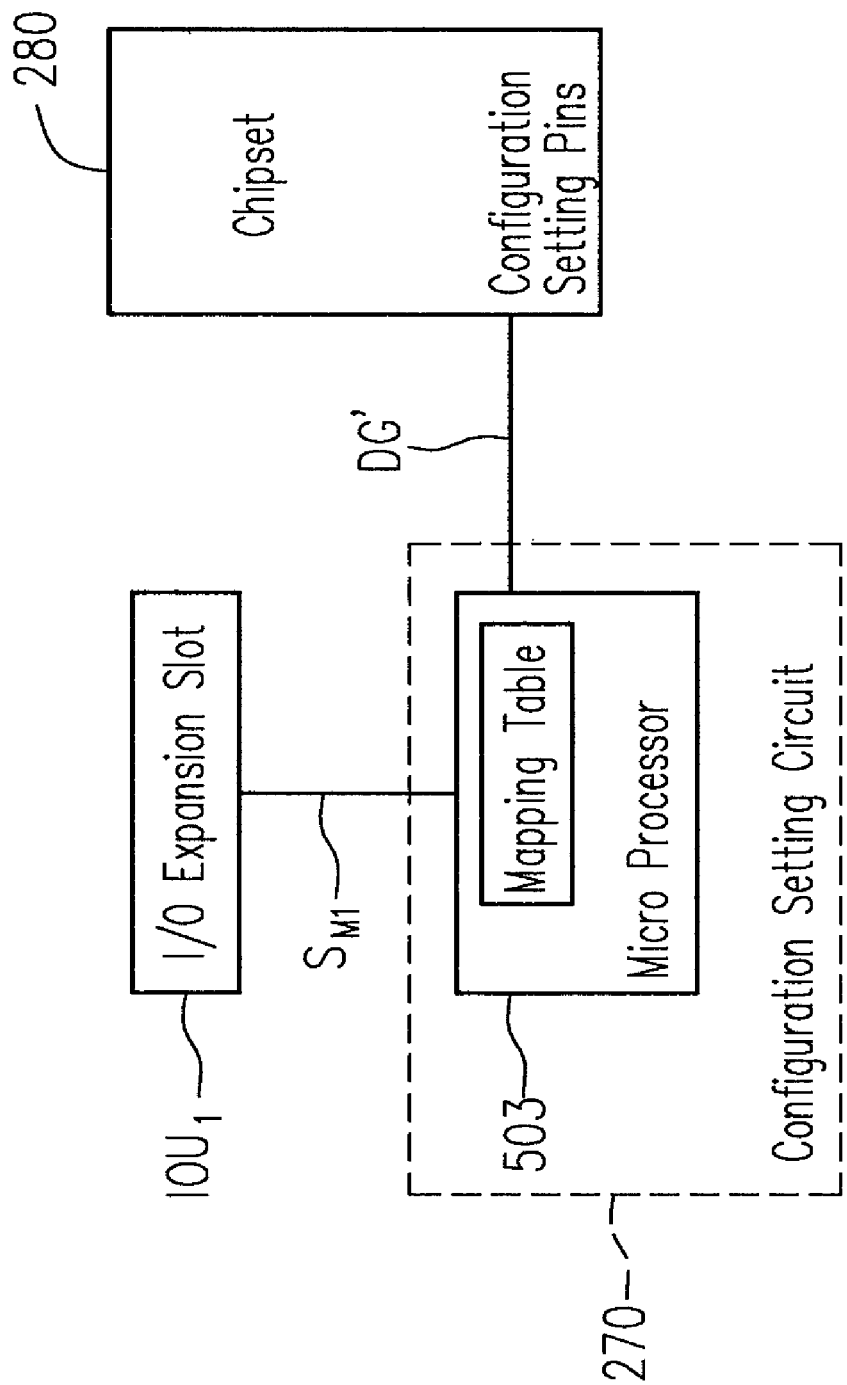
FIG. 5C illustrates a diagram of the configuration setting circuit of a fourth embodiment of the present invention.

A fourth embodiment will be described with reference to FIG. 5C in which the configuration setting circuit 270 includes a micro processor 503. The micro processor 503 is coupled to the configuration setting pins PEWIDTH[5..0] of the chipset 280 and the I/O expansion slot $IOU_1$. The micro processor 503 includes a mapping table therein. The micro processor 503 looks up a digital code DG' corresponding to the bandwidth configuration message $S_{M1}$ in the mapping table and transmits the digital code DG' to the configuration setting pins PEWIDTH[5..0] of the chipset 280 to set the internal PCI-Express bandwidth configuration in the chipset 280.

In the first embodiment of the present invention described above, as shown in Table 1, the I/O expansion slot $IOU_1$ consists of sixteen differential lines evenly allocated into four ports (i.e., Port7~Port10). As such, each port has four differential lines and bandwidth configuration settings of the I/O expansion slot $IOU_1$ are achieved by various combinations of the four ports. The I/O expansion slot $IOU_1$ has five bandwidth configuration settings as shown in Table 2. The I/O expansion slot $IOU_1$ needs three selection bits as indicated by the bandwidth configuration message $S_{M1}[2..0]$. The I/O expansion card 210 plugged into the I/O expansion slot $IOU_1$ can generate a corresponding bandwidth configuration signal $S_{M1}[2..0]$ based on its bandwidth configuration requirement and transmit the bandwidth configuration signal $S_{M1}[2..0]$ to the configuration setting circuit 270 through the I/O expansion slot $IOU_1$.

TABLE 2

Bandwidth Configuration Settings Table For I/O Expansion Slot $IOU_1$

| $IOU_1$ | | | | |
|---|---|---|---|---|
| Port7 x4 | Port8 x4 | Port9 x4 | Port10 x4 | $S_{M1}[2\ldots0]$ |
| X4 | x4 | x4 | x4 | 000 |
| X8 | | x4 | x4 | 001 |
| X4 | x4 | x8 | | 010 |
| X8 | | x8 | | 011 |
| x16 | | | | 100 |

As shown in Table 3, the I/O expansion slot $IOU_0$ consists of sixteen differential lines evenly allocated into four ports (i.e., Port3~Port6). As such, each port has four differential lines and bandwidth configuration settings of the I/O expansion slot $IOU_0$ are achieved by various combinations of the four ports. The I/O expansion slot $IOU_0$ has five bandwidth configuration settings as shown in Table 3. The I/O expansion slot $IOU_0$ needs three selection bits as indicated by the bandwidth configuration message $S_{M0}[2..0]$.

TABLE 3

Bandwidth Configuration Settings Table For I/O Expansion Slot $IOU_0$

| $IOU_0$ | | | | |
|---|---|---|---|---|
| Port3 x4 | Port4 x4 | Port5 x4 | Port6 x4 | $S_{M0}[2\ldots0]$ |
| x4 | x4 | x4 | x4 | 000 |
| x8 | | x4 | x4 | 001 |
| x4 | x4 | X8 | | 010 |
| x8 | | X8 | | 011 |
| X16 | | | | 100 |

As shown in Table 4, the I/O expansion slot $IOU_2$ consists of four differential lines evenly allocated into two ports (i.e., Port1~Port2). As such, each port has two differential lines and bandwidth configuration settings of the I/O expansion slot $IOU_2$ are achieved by various combinations of the two ports. The I/O expansion slot $IOU_2$ has two bandwidth configuration settings as shown in Table 4. The I/O expansion slot $IOU_2$ needs one selection bit as indicated by the bandwidth configuration message $S_{M2}[0]$. In the present embodiment, the I/O expansion slots $IOU_0$ and $IOU_2$ can be configured in the similar way as described above with respect to the I/O expansion slots $IOU_1$ and therefore explanation thereof is not repeated herein.

TABLE 4

Bandwidth Configuration Settings Table For I/O Expansion Slot $IOU_2$

| $IOU_2$ | | |
|---|---|---|
| Port1 x2 | Port2 X2 | $S_{M2}[0]$ |
| x2 | X2 | 0 |
| x4 | | 1 |

The configuration setting circuit 270 generates a corresponding bandwidth configuration signal $S_C$ (referring to Table 1) according to the bandwidth configuration message $S_{M2}[0]$ of the I/O Expansion Slot $IOU_2$ (referring to Table 4), according to the bandwidth configuration message $S_{M1}[2..0]$ of the I/O Expansion Slot $IOU_1$ (referring to Table 2), and/or according to the bandwidth configuration message $S_{M0}[2..0]$ of the I/O Expansion Slot $IOU_0$ (referring to Table 3). The bandwidth configuration signal $S_C$ is transmitted to the configuration setting pins PEWIDTH[5..0] of the chipset 280 to set the internal interface-card-bandwidth configuration in the chipset 280. Those skilled in the art will appreciate that the configuration setting circuit 270 can be implemented as one of a CPLD 501, an encoding circuit 502 and a micro processor 503 upon reading the description of the embodiments above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer comprising:
  a first I/O expansion card comprising:
    a first interface card slot for selectively accepting an first interface card; and
    a first configuration message generator configured to provide a first bandwidth configuration message corresponding to the first interface card slot;
  a second I/O expansion card comprising:
    a second interface card slot for selectively accepting a second interface card; and
    a second configuration message generator configured to provide a second bandwidth configuration message corresponding to the second interface card slot, wherein the first and the second bandwidth configuration messages are different; and
  a motherboard comprising:
    an I/O expansion slot for accepting the first I/O expansion card or the second I/O expansion card;
    a chipset coupled to the I/O expansion slot so as to be connected to the first interface card slot of the first I/O expansion card or the second interface card slot of the second I/O expansion card through the I/O expansion slot; and
    a configuration setting circuit coupled to the chipset and the I/O expansion slot, the configuration setting circuit configured to obtain the first bandwidth configuration message or the second bandwidth configuration message through the I/O expansion slot and set an internal interface-card-bandwidth configuration in the chipset based on difference between the first bandwidth configuration message and the second bandwidth configuration message.

2. The computer according to claim 1, wherein the chipset is a north bridge chip.

3. The computer according to claim 1, wherein the first and the second interface card slots are PCI-Express slots, and the internal interface-card-bandwidth configuration set by the configuration setting circuit is a PCI-Express bandwidth configuration in the chipset.

4. The computer according to claim 1, wherein the configuration setting circuit is coupled to configuration setting pins of the chipset, and the configuration setting circuit comprises:

a default digital code generating circuit configured to generate a default digital code; and an adjustment circuit coupled to the default digital code generating circuit, the configuration setting pins of the chipset and the I/O expansion slot, the adjustment circuit configured to adjust the default digital code provided by the default digital code generating circuit according to difference between the first bandwidth configuration message and the second bandwidth configuration message and output the adjusted default digital code to the configuration setting pins of the chipset to set the internal interface-card-bandwidth configuration in the chipset.

5. The computer according to claim 1, wherein the configuration setting circuit is coupled to configuration setting pins of the chipset, the configuration setting circuit comprises a complex programmable logic device coupled to the configuration setting pins of the chipset and the I/O expansion slot, and the complex programmable logic device is configured to generate a corresponding digital code according to difference between the first bandwidth configuration message and the second bandwidth configuration message and output the digital code to the configuration setting pins of the chipset to set the internal interface-card-bandwidth configuration in the chipset.

6. The computer according to claim 1, wherein the configuration setting circuit is coupled to configuration setting pins of the chipset, the configuration setting circuit comprises an encoding circuit coupled to the configuration setting pins of the chipset and the I/O expansion slot, and the encoding circuit is configured to generate a corresponding digital code by encoding the first bandwidth configuration message or the second bandwidth configuration message and output the digital code to the configuration setting pins of the chipset to set the internal interface-card-bandwidth configuration in the chipset.

7. The computer according to claim 1, wherein the configuration setting circuit is coupled to configuration setting pins of the chipset, the configuration setting circuit comprises a micro processor coupled to the configuration setting pins of the chipset and the I/O expansion slot, and the micro processor is configured to look up a digital code corresponding to the first bandwidth configuration message or the second bandwidth configuration message in a mapping table and output the digital code to the configuration setting pins of the chipset to set the internal interface-card-bandwidth configuration in the chipset.

* * * * *